…

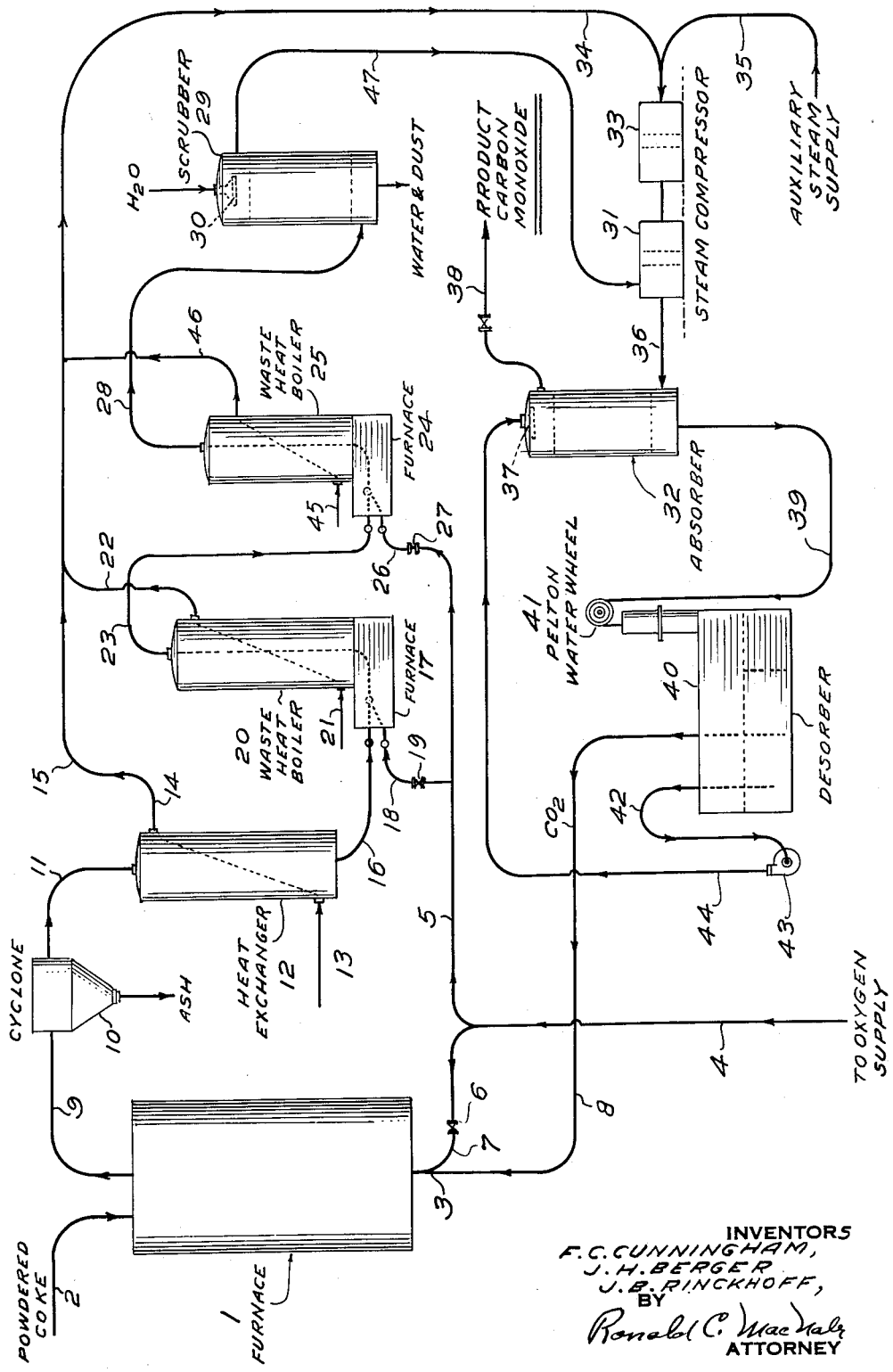

United States Patent Office 2,737,448
Patented Mar. 6, 1956

2,737,448

CONTINUOUS PRODUCTION OF PURE CARBON MONOXIDE FROM COKE AND OXYGEN

Frederick C. Cunningham, Mariemont, Ohio, John H. Berger, White Plains, N. Y., and John B. Rinckhoff, Fanwood, N. J., assignors to Chemical Construction Corporation, New York, N. Y., a corporation of Delaware Application May 14, 1952, Serial No. 287,774

7 Claims. (Cl. 23—204)

This invention relates to the production of substantially pure, nitrogen-free carbon monoxide useful in the synthesis of methanol and for other purposes. More specifically, the invention provides an improved, continuous, cyclic process for producing substantially pure, nitrogen-free carbon monoxide which comprises, reacting substantially pure oxygen with an excess of carbonaceous material to produce carbon monoxide while repressing the heat of the reaction by addition of a limited amount of carbon dioxide, the carbon dioxide being obtained by subsequently partially burning the carbon monoxide thus produced with limited amounts of oxygen to produce a carbon monoxide-carbon dioxide gas mixture and utilizing the heat of the reactions involved to produce power for compressing the carbon monoxide-carbon dioxide mixture in a process of separating and returning the carbon dioxide for use as the repressant in the first named reaction and recovering pressurized, substantially pure carbon monoxide.

It has heretofore been proposed to produce substantially pure carbon monoxide by reacting oxygen obtained from an oxygen plant with carbon and to temper the heat of the reaction by addition of carbon dioxide. One difficulty with the process as proposed, however, is that it is dependent upon an outside source of supply for obtaining pure carbon dioxide.

An object of the present invention is to provide such a process which is self-contained as regards the provision of the necessary pure carbon dioxide.

A further object of the invention is the provision of such a process in which the quantity of carbon dioxide desired is obtained by burning part of the carbon monoxide produced with pure oxygen.

A still further object of the invention is the provision of such a process in which the heat of the reactions involved is utilized to produce at least part of the energy necessary to effect separation of the carbon monoxide-carbon dioxide mixture produced during the process and in addition deliver as finished product, substantially pure carbon monoxide at fifteen to twenty atmospheres pressure.

These objects and other objects and advantages, more or less ancillary to the foregoing, and the manner in which they are attained will become apparent from the following detailed description of a preferred embodiment of the invention, reference being made to the accompanying drawing the single figure of which is a flow sheet in which the various pieces of apparatus are illustrated diagrammatically.

Referring to the drawing, the numeral 1 designates a furnace or other reaction vessel in which there is maintained a fluidized bed of burning, powdered coke. For this purpose the furnace is continuously supplied with dry, powdered coke as at 2 and a mixture of substantially pure oxygen and substantially pure carbon dioxide as at 3. The oxygen may be supplied from a battery of tanks, not shown, or may be piped directly from an oxygen plant. In either event, it enters the system through pipe 4 connected to oxygen manifold 5 from which it is released as desired by means of valve 6 and pipe 7 into the furnace through pipe 3. The carbon dioxide, which is produced during the process as will later be described, is delivered to pipe 3 through pipe 8 and plays the part of an active diluent in the reaction that takes place in the furnace. It not only absorbs part of the heat of the reaction of the oxygen with the carbon, thereby serving as a control for the temperature in the furnace, but in doing so it is itself converted into carbon monoxide by reaction with excess carbon. For this purpose a mixture containing about 1 part carbon dioxide and 1.75 parts oxygen will react in the presence of an excess of powdered coke or carbonaceous material to produce an equilibrium gas consisting of about 99.8% carbon monoxide at a temperature of 1350° K. The carbon monoxide thus produced is conducted away from the furnace by pipe 9 to a cyclone separator 10 for the removal of dust and ash as shown, and the clean, hot gas leaving the separator by pipe 11 is delivered to a waste heat boiler or heat exchanger 12. In the boiler the carbon monoxide is cooled to about 600° K. by heat exchange with water and produces saturated steam at approximately 225 p. s. i. a. which is discharged through pipe 14 into steam header or manifold 15. Leaving exchanger 12 by means of pipe 16 the carbon monoxide is partially burned in furnace 17 with a controlled or limited amount of oxygen which is fed into the furnace from manifold 5 through pipe 18 provided with valve 19.

Furnace 17 may advantageously be provided with a boiler section 20 formed integral therewith, as shown, to receive the products of combustion. The temperature in the furnace is advantageously maintained at about 1270° K. by controlling the amount of oxygen consumed, and the hot gases, which consist of a mixture of carbon monoxide and carbon dioxide are passed through boiler 20 in heat exchange relation with water which enters the boiler at 21 and leaves as steam at about 473° K. through pipe 22 for discharge into steam header 15. The mixture of carbon monoxide and carbon dioxide, cooled to about 600° K. leaves boiler 20 through pipe 23 and is conducted to a second furnace 24 provided with a boiler 25, like the furnace and boiler 17 and 20 just described. Here the gas is again subjected to a partial burning to further increase its carbon dioxide content by combustion with additional oxygen delivered to the furnace from manifold 5 and discharged through valve 27 and pipe 26 into the furnace. Additional steam is also produced in boiler 25. The water enters at 45 and discharges as steam at 46 to join the previously produced steam in header 15. In this way a substantial quantity of steam at a pressure of about 225 lbs. per sq. inch is generated and collected in steam header 15 for use later in the process.

The carbon monoxide-carbon dioxide gas leaving waste heat boiler 25 at about 600° K. is directed through pipe 28 to a water cooler and scrubber 29 in which the gas is cooled to about 300° K. and washed free of any contained dust. The gas enters the scrubber near the bottom as shown and passes upwardly through the usual checker work of packing material in counter current to a spray of water discharged from sprinkler head 30. Leaving the scrubber by means of pipe 47 the gas passes to a compressor 31 where it is compressed to from 15 to 20 atmospheres and is discharged through pipe 36 into an absorber 32. The compressor is driven by steam engine 33 which is operated by steam delivered from header 15 by means of pipe 34. When necessary, additional steam for operating the engine may be secured from an outside source through valved pipe 35 which may connect with the engine through pipe 34 as shown. Absorber 32 may be of the usual construction adapted for operation at from 15 to 20 atmospheres pressure. As shown the gas from the compressor enters the base of the absorber through pipe 36 and passes upwardly counter-current to a downwardly directed flow of water from sprinkler 37. Under pressure, substantially all of the carbon dioxide in the gas dissolves in the water in the absorber so that the gas which leaves at the top through valved pipe 38 is substantially pure carbon monoxide at from 15 to 20 atmospheres pressure. Water containing dissolved carbon dioxide leaves the absorber by way of pipe 39 and passes to a desorber 40. Before entering the desorber the water passes through a device such as a pelton wheel 41 to reduce the pressure to substantially atmospheric and enable recovery of available power.

Upon release of pressure on the water the carbon dioxide comes out of solution and is conducted by way of pipe 8 from the desorber to pipe 3 for delivery to furnace 1 as heretofore explained. Water is constantly withdrawn from the desorber through pipe 42 by pump 43 and recycled under pressure back to the absorber through pipe 44 as shown. The carbon monoxide leaving the absorber through pipe 38 may be passed directly to a methanol synthesis plant or it may be stored in tanks or pressure cylinders for use as desired.

It will be seen from the above that there is provided a continuous, highly efficient process for producing pure carbon monoxide in quantity. The process is simple in operation though self-contained in the production of the carbon dioxide used in the process. The control of the reactions in the manner described enables substantially full utilization of the heat developed for the production of steam which in turn is efficiently utilized in the process of separating the carbon monoxide from the carbon dioxide and delivering the carbon monoxide as product, under pressure. Other sources of carbon than coke may be used depending upon the desired ultimate purity of the carbon monoxide produced. Among these are various grades of coal and wood charcoal.

In addition, the process may be varied, as for instance by using more or less than the number of stages described, for the recovery of heat and the combustion of carbon monoxide to carbon dioxide. It is believed apparent that while a preferred form of the invention has been described, many changes and modifications may be made in the process disclosed without departing from the spirit of the invention defined in the following claims.

We claim:

1. A continuous cyclic process for the production of substantially pure, nitrogen-free, carbon monoxide which comprises reacting substantially pure oxygen and carbonaceous fuel to produce carbon monoxide and heat while simultaneously tempering the heat of reaction by diluting the oxygen with carbon dioxide to produce additional carbon monoxide, reacting the carbon monoxide so produced with a limited amount of oxygen in a subsequent step to produce a carbon monoxide-carbon dioxide gas mixture and additional heat, utilizing at least some of the heat of said reactions to produce power for compressing the carbon monoxide-carbon dioxide mixture, separating the carbon dioxide from said mixture while under pressure and recycling it to the first named reaction, and recovering the remaining compressed gas as pressurized, substantially pure, nitrogen-free carbon monoxide.

2. The process of claim 1 in which the carbonaceous fuel is a member of the class consisting of coke, coal and wood charcoal.

3. The process of continuously producing substantially pure, nitrogen-free carbon monoxide which comprises reacting oxygen with an excess of fluidized powdered coke in the presence of sufficient, added carbon-dioxide, as an active diluent, to maintain a reaction temperature which will produce an equilibrium gas of high carbon monoxide content, cooling the gas by heat exchange with water to produce pressure steam, burning the carbon monoxide in successive stages with limited amounts of oxygen to produce a total quantity of carbon dioxide in said gas equivalent to the quantity of carbon dioxide originally used as the active diluent, producing additional pressure steam in each successive stage by heat exchange of the hot gases with water, compressing the resultant carbon monoxide-carbon dioxide gas mixture with the aid of said pressure steam, separating the carbon dioxide under pressure from the carbon monoxide, recovering the carbon monoxide under said compression as product and recycling the separated carbon dioxide as the active diluent in the first mentioned step of the process.

4. A continuous, cyclic process for the production of substantially pure, nitrogen-free carbon monoxide which comprises the steps of burning a stream of substantially pure carbon monoxide in stages with limited amounts of substantially pure oxygen to produce a carbon monoxide-carbon dioxide gas mixture, converting the heat produced in each stage into pressure steam by conducting said burning in heat exchange boilers, compressing the resulting carbon monoxide and carbon dioxide gas mixture with the aid of said pressure steam, separating the carbon dioxide from the compressed gas, recovering compressed, substantially pure, nitrogen-free carbon monoxide, and converting the carbon dioxide to carbon monoxide by reacting it together with pure oxygen and an excess of carbonaceous material to produce the substantially pure carbon monoxide used in the first step.

5. In a process for continuously producing substantially pure, nitrogen-free carbon monoxide from the combustion of carbon with a mixture of substantially pure oxygen and carbon dioxide the improvement which comprises burning the carbon monoxide in stages with controlled, limited amounts of oxygen to produce a mixture of substantially pure carbon monoxide-carbon dioxide, recovering the heat of combustion of said burning as pressure steam, utilizing the pressure steam to operate a pump to compress the carbon monoxide-carbon dioxide mixture, separating the carbon dioxide by absorption under said compression, recovering the separated carbon monoxide as product and separately recovering the absorbed carbon dioxide for admixture with oxygen for the production of substantially pure carbon monoxide by reaction with carbon.

6. The subject matter of claim 5 wherein separation of the carbon dioxide is by absorption in water.

7. The method of continuously producing substantially pure, nitrogen-free carbon monoxide from coke and oxygen which comprises, reacting oxygen with coke at elevated temperature in the presence of sufficient, added carbon dioxide to maintain a reaction temperature of about 1350° K. and produce a gas containing approximately 99.8% carbon monoxide, cooling the gas by heat exchange with water to produce pressure steam, burning said cooled gas with a controlled amount of oxygen to produce a gaseous mixture of carbon monoxide and carbon dioxide, recovering the heat of reaction of said burning by heat exchange of the hot gases with water to again cool the gases and produce additional pressure steam, reburning the gaseous mixture of carbon monoxide and carbon dioxide with an additionally controlled amount of oxygen to produce additional carbon dioxide in the gas which quantity of carbon dioxide together with said first formed carbon dioxide substantially equals the quantity of carbon dioxide originally introduced to control the heat of reaction of the oxygen with coke, cooling said gaseous mixture by heat exchange with water to produce additional steam, collecting the pressure steam produced as a result of said burnings and utilizing it to compress the cooled gases to approximately 20 atmospheres, scrubbing the compressed gases with water to separate the carbon dioxide from the carbon monoxide and recovering the carbon monoxide, degasifying the water to recover the dissolved carbon dioxide and mixing the recovered carbon dioxide with additional oxygen for reaction with coke in the first step of the process.

References Cited in the file of this patent

FOREIGN PATENTS 523,221   Great Britain _____ July 9, 1940